United States Patent [19]
Miller

[11] 3,926,045
[45] Dec. 16, 1975

[54] FLOW SENSOR AND SYSTEM
[75] Inventor: Gerald K. Miller, Hersey, Mich.
[73] Assignee: Nartron Corporation, Reed City, Mich.
[22] Filed: Jan. 30, 1974
[21] Appl. No.: 437,926

[52] U.S. Cl................................ 73/114; 235/150.21
[51] Int. Cl.² ........................................ G01M 15/00
[58] Field of Search.................. 73/114; 235/150.21

[56] References Cited
UNITED STATES PATENTS

| | | | |
|---|---|---|---|
| 3,181,353 | 5/1965 | Brahm et al. | 73/117.3 |
| 3,537,302 | 11/1970 | Marek et al. | 73/114 |
| 3,683,684 | 8/1972 | Judlowe | 73/114 X |
| 3,812,710 | 5/1974 | Bauman et al. | 73/114 |

FOREIGN PATENTS OR APPLICATIONS 726,813  12/1966  Italy.................................... 73/114

Primary Examiner—Charles A. Ruehl
Attorney, Agent, or Firm—Lon H. Romanski

[57] ABSTRACT

A flow sensor has a housing with an inlet and outlet formed therein with a cylindrical passage interconnecting the inlet and outlet. An axially slidable piston contained in the cylindrical passage is resiliently urged in one axial direction while fluid supplied through the inlet and brought against a face of the piston creates a force thereagainst as to move the piston axially in a second direction opposite to the said one axial direction. The axial position of the piston determines the degree of opening of an associated variable area orifice so that, generally, the more the piston is moved in the second direction the greater is the effective flow area of the associated variable area orifice. Associated variably controlled electrical signal producing means are operatively connected to the piston so that such electrical signal producing means becomes effective for producing an electrical signal of a magnitude reflective and indicative of the axial position attained by the piston. Related electrical circuitry employs such an electrical signal to ultimately produce direct meter read-outs of such information as, for example, the rate of fuel consumption by a vehicular engine in terms of gallons of fuel per hour and/or miles of vehicular travel per gallon of fuel.

9 Claims, 21 Drawing Figures

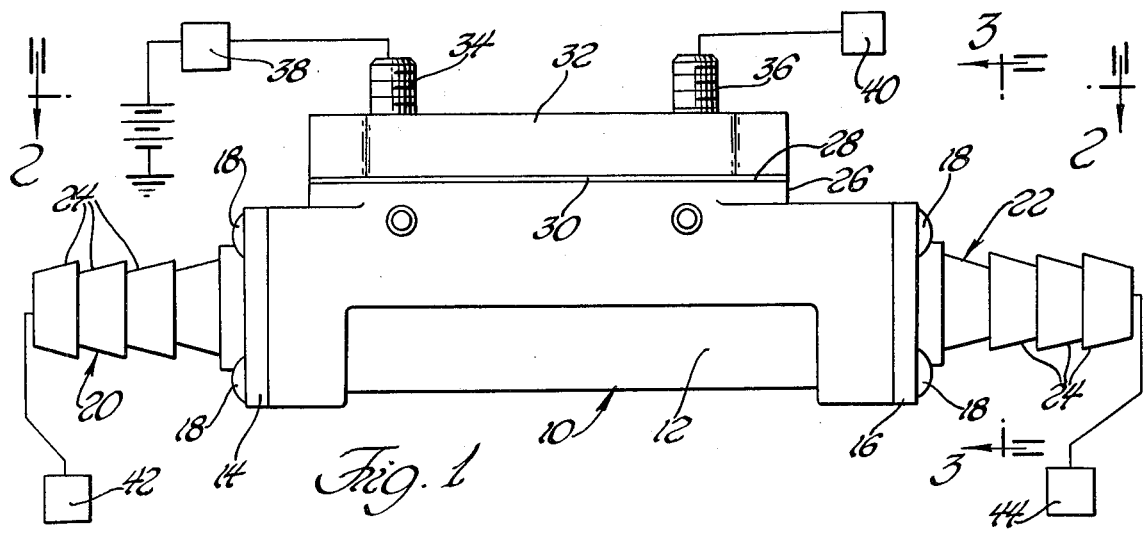
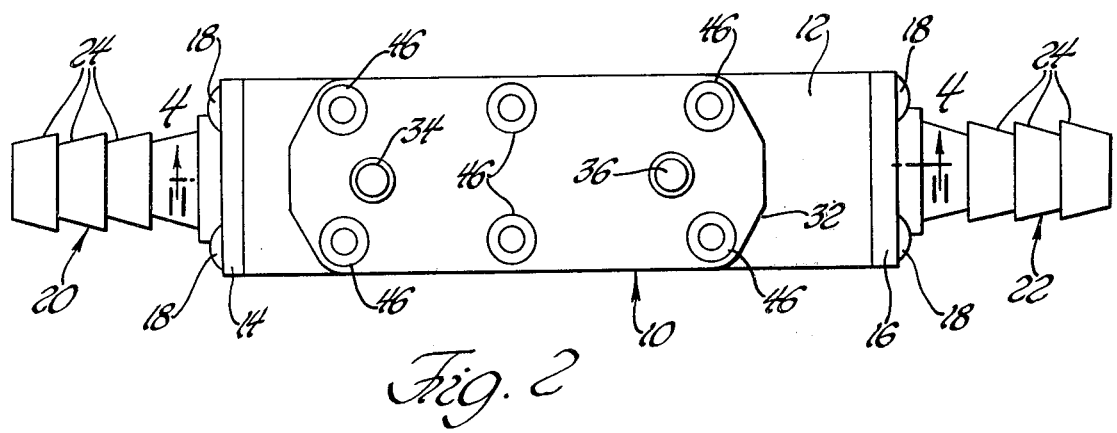
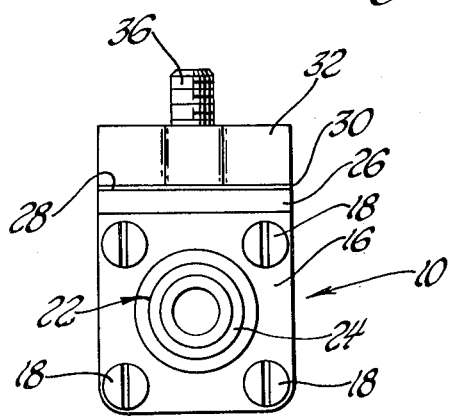

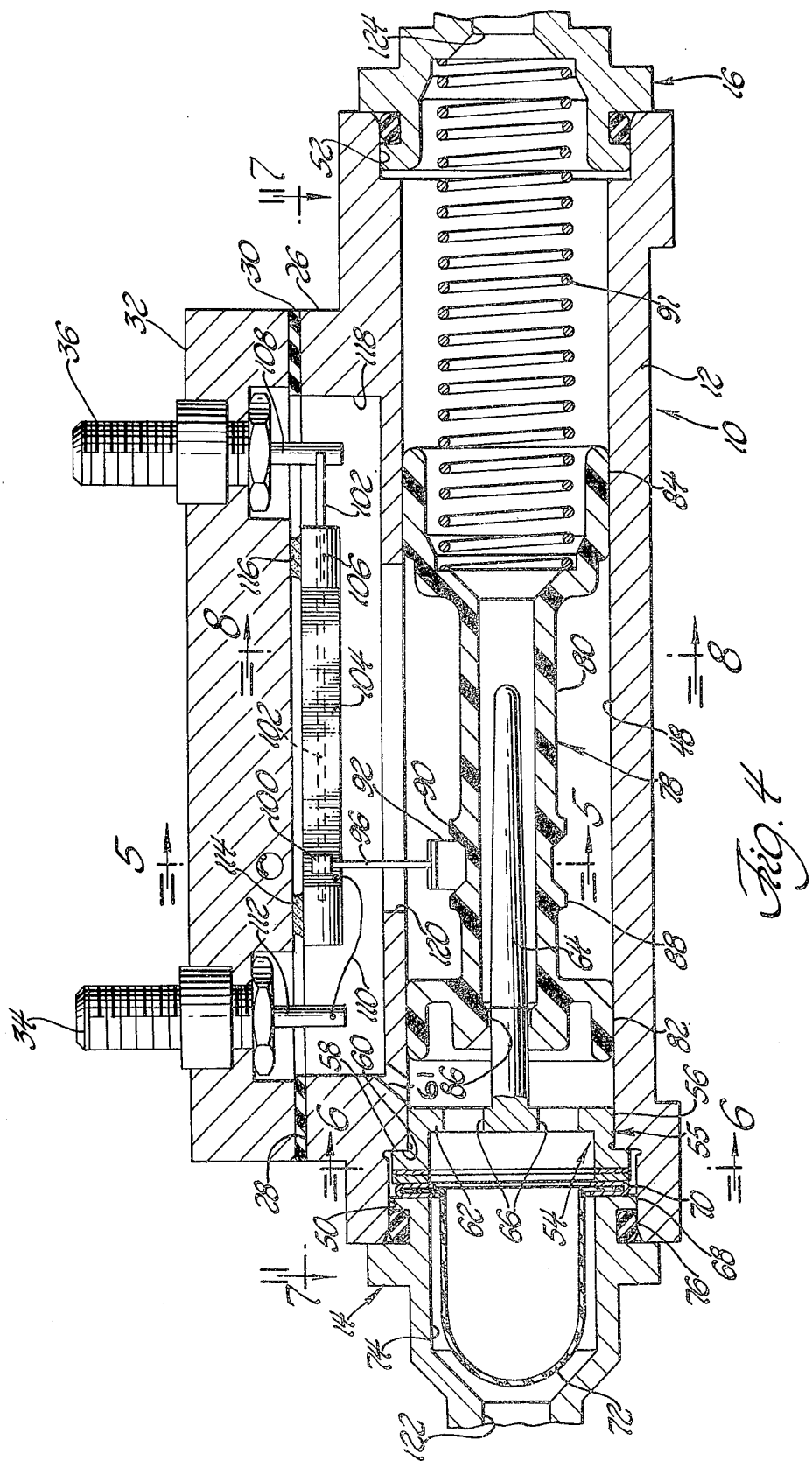

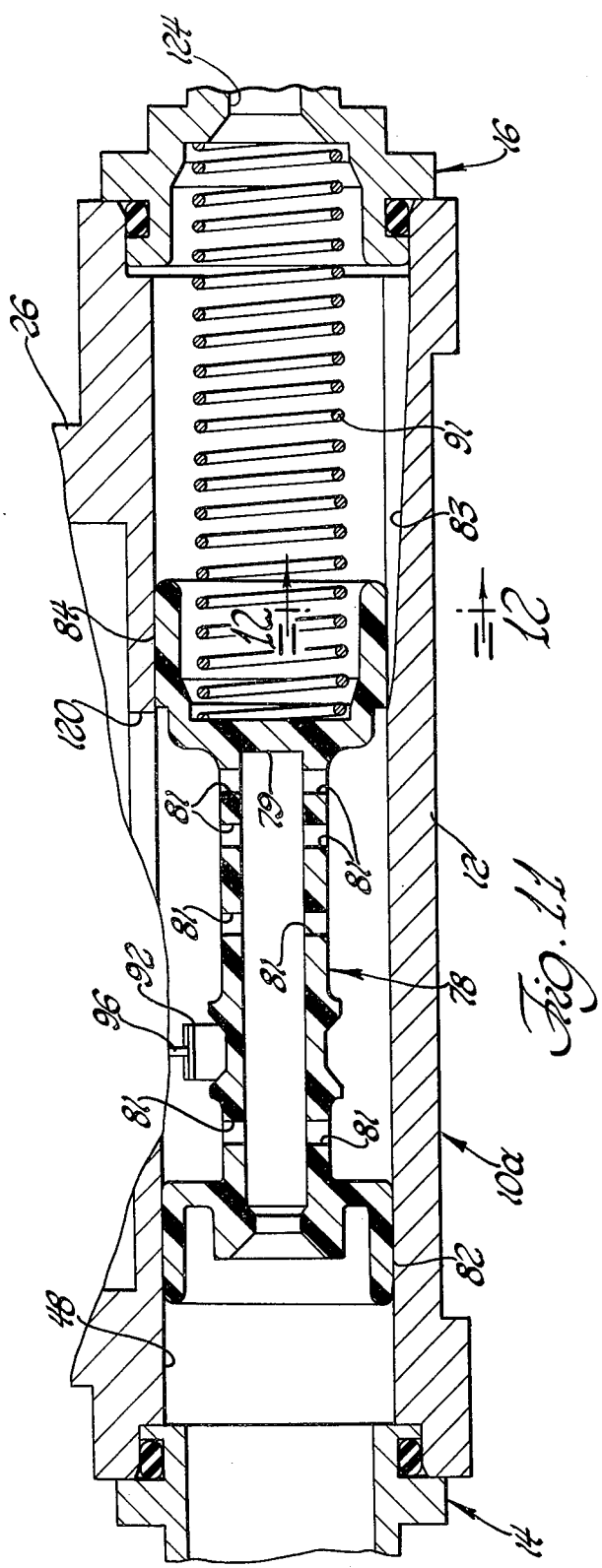
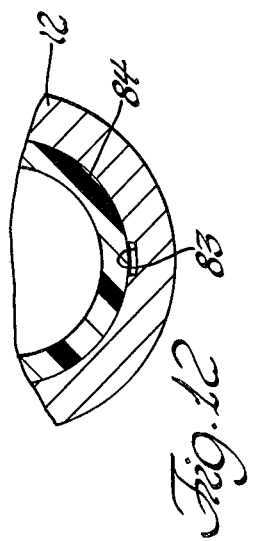
Fig. 11
Fig. 12

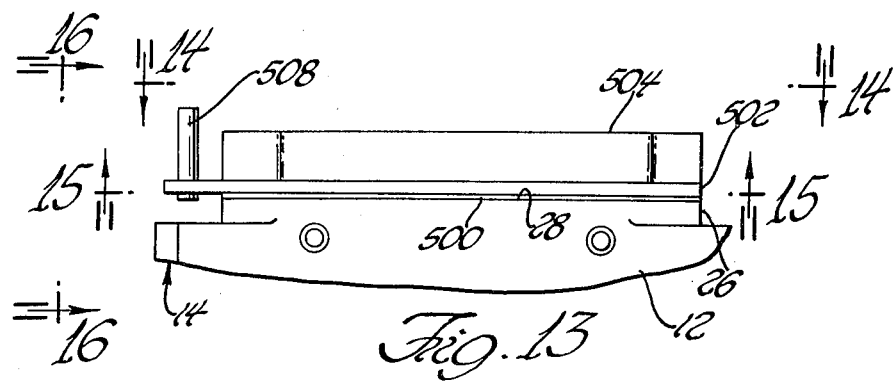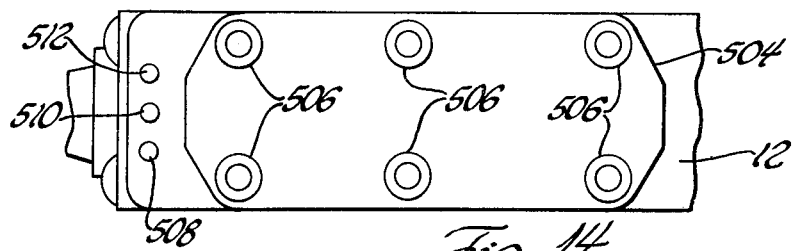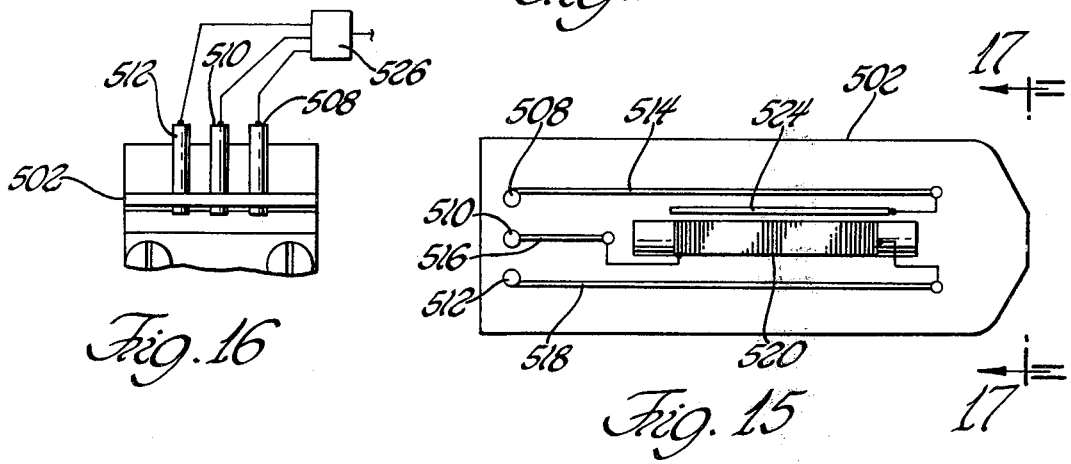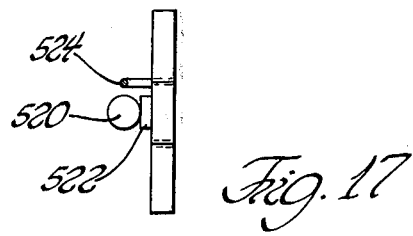

FLOW SENSOR AND SYSTEM

BACKGROUND OF THE INVENTION

Generally, in the art of sensing, metering or measuring fluid flows various arrangements and devices have heretofore been proposed. However, all of such prior art proposals have been found wanting in at least some respect.

One of the devices proposed by the prior art employs a restrictive float member placed in, for example, the fuel stream of an engine's fuel supply system. The displacement of the float, responsive to the rate of flow, is coupled to a variable resistor as, for example, a rheostat. The resistance of the rheostat is changed as by either a mechanical or magnetic coupling between the float and the wiper arm of the rheostat. Such floats have difficulty in being sensitive to a range of flows which may vary, in an automotive engine from, for example, 30.0 c.c. per minute to 500.0 c.c. per minute. Further, the response time for such floats, because of their inherent inertia, is, comparatively slow thereby making them inadequate especially in situations where transient conditions are to be sensed but where the duration of such transient condition is relatively short.

Others of the prior art have proposed the use of a flow orifice, of fixed dimension, situated in the stream of flow of fluid. A manometer-like tube is then connected, at its opposite ends, to opposite sides of such flow orifice as to thereby be in communication with the pressures next to but upstream and downstream of such flow orifice. A related electrically conductive fluid, such as mercury, along with an electrical resistance element are contained in the manometer tube so that as the mercury moves in response to the pressure differential across the flow orifice the mercury changes the effective resistance of the resistance element and thereby creates an electrical signal related to the rate of flow of fluid through the flow orifice. One of the major problems of such an arrangement is that in such flow orifices the rate of flow therethrough is not a linear function of the pressure differential thereacross but rather proportional to the square of the pressure differential and therefore an exponential function. This immediately causes the system to be less sensitive where any significant range of fluid flow is to be sensed. Others have proposed what may be considered as modifications of the flow orifice and manometer combination. That is, the fluid within the manometer tube is employed to move a shutter-like member which is effective for varying the intensity of a light ray or beam impinging upon a related photocell. Aside from the problems of the basic system, the employment of the shutter raises further problems as, for example, the undetermined continued reliability of the light source, inherent accuracy of the shutter, mass and inertia of the shutter, and sensitivity and continued reliability of the photocell.

The prior art has also proposed employing the use of a heater-type electrical resistance within the stream of a fluid flow. Generally, as the rate of flow of fluid by and around the heater varies the rate of heat flow from the heater to the fluid will also vary. Such changes in heat flow may then, indirectly, be employed in creating an electrical signal indicative of fluid flow. However, among other attendant problems, such an arrangement is very slow in its response time and, as such, is practically ineffective for continuously monitoring rapidly changing or short duration transient conditions.

Still others have suggested the use of paddle-wheel-like members which are placed, at least partially, in the stream of flow. As the paddle-wheel turns in response to flow, the rate of turning is employed as a fluid flow signal. The problems of inertia inherent make such a system practically useless.

The prior art devices have further had difficulties in that because of the philosophy of the flow sensing apparatus the ultimate read-out meters are usually required to be in a generally analog fashion with non-uniformity as between succeeding graduations on the scales of the read-out meters. As a consequence thereof, the observer or vehicle operator is more often than not unable, by visual glance, to determine with any real degree of certainty the actual value indicated by such read-out meter.

Further, generally, the devices and systems proposed by the prior art are often deleteriously affected by variations in density of the fluid being flowed. The most dramatic in this respect is attempting to sense the rate of flow of ambient air. If ambient temperature or barometric pressure changes the ambient air responds quickly thereto by increasing or decreasing, as the case may be, its density and therefore correspondingly varying its mass for a given volume. Accordingly, if, for example, ambient air is to be mixed with fuel in a particular ratio of masses, it becomes imperative that the system sensing or metering the air not be affected by variations in density but instead be a true mass fluid flow sensor.

Accordingly, the invention as herein disclosed and described is primarily intended to overcome the above and other attendant problems of the prior art.

BRIEF DESCRIPTION OF THE DRAWINGS

In the drawings, wherein for purposes of clarity certain details and elements may be omitted:

FIG. 1 is a side elevational view of a flow sensor constructed in accordance with the teachings of the invention;

FIG. 2 is a top plan view taken generally on the plane of line 2—2 of FIG. 1 and looking in the direction of the arrows;

FIG. 3 is an end elevational view taken generally on the plane of line 3—3 of FIG. 1 and looking in the direction of the arrows with element 22 being also shown in elevation;

FIG. 4 is an enlarged axial cross-sectional view, of the flow sensor of FIG. 1, taken generally on the plane of line 4—4 of FIG. 2 and looking in the direction of the arrows;

FIG. 11 is a fragmentary view similar to FIG. 4 but illustrating a modification of the fluid flow sensor of FIG. 4;

FIG. 12 is a fragmentary cross-sectional view taken generally on the plane of line 12—12 of FIG. 11 and looking in th direction of the arrows;

FIG. 13 is a fragmentary side elevational view similar to FIG. 1 but illustrating a modification of certain of the elements of FIG. 1;

FIG. 14 is a top plan view taken generally on the plane of line 14—14 of FIG. 13 and looking in the direction of the arrows;

FIG. 15 is a plan view of one of the elements of FIG. 13, taken generally on the plane of line 15—15 of FIG. 13 and showing, also in elevation, certain of the elements carried thereby;

FIG. 16 is a fragmentary end elevational view taken generally on the plane of line 16—16 of FIG. 13 and looking in the direction of the arrows;

FIG. 17 is an end elevational view taken generally on the plane of line 17—17 of FIG. 15 and looking in the direction of the arrows;

DETAILED DESCRIPTION OF PREFERRED EMBODIMENTS

Figure 10:
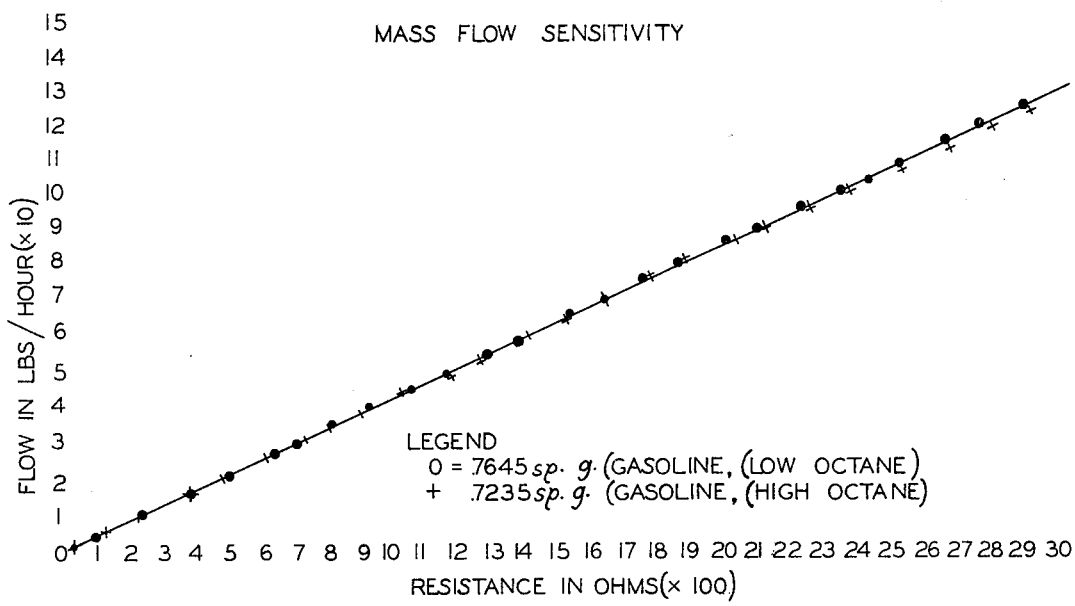
FIG. 10 is a graph indicating, typically, the high and accurate sensitivity attained by the invention in measuring fluid flows.

Referring now in greater detail to the drawings, FIG. 1 illustrates, in side elevational view, a flow sensor assembly 10 embodying the teachings of the invention. As shown, the flow sensor assembly 10 may be comprised of a main housing 12 with first and second end cap members 14 and 16 suitably secured to housing 12 as by screws 18. If desired, tubular portions 20 and 22 of end cap members 14 and 16, respectively, may be provided with stepped or conical surface portions 24 as to thereby enable, for example, the fitting thereover of resilient hose or conduit means leading to and from the flow sensor assembly 10.

The upper part of housing 12 is preferably provided with an extension-like portion 26 defining a surface 28 against which a suitable seal 30 is situated and which, in turn, receives thereatop a cover member 32 carrying electrical terminals 34 and 36. As generally diagrammatically illustrated, terminals 34 and 36 are suitably electrically connected to related electrical circuit means of which 38 and 40 may comprise portions. Further, as diagrammatically illustrated, related means 42 supplies fluid flow through the flow sensor assembly 10 while means 44 receives such fluid flow as passes through the flow sensor 10. As should be apparent, means 42 may, in fact, be suitable pumping means effective to provide a variable rate of fuel flow in order to thereby satisfy the demands of, for example, an internal combustion engine which, in such case could be represented by means 44.

Although the cover 32 may be retained by any suitable means, as best shown in FIG. 2, a plurality of screws 46 are employed to detachably secure cover 32 to main housing 12.

Figure 6:
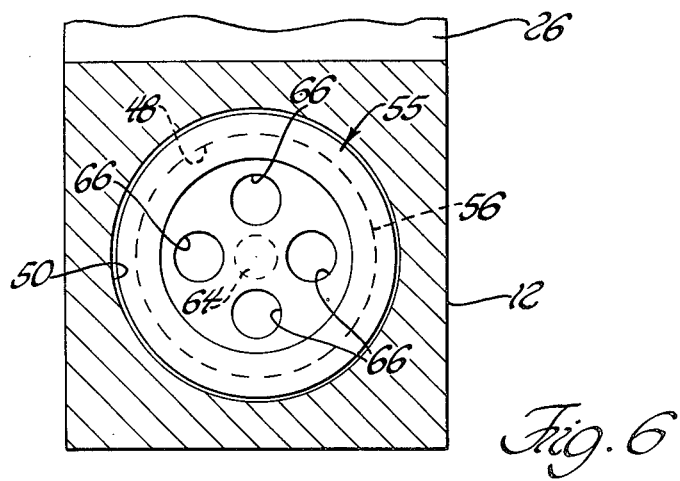
FIG. 6 is a cross-sectional view taken generally on the plane of line 6—6 of FIG. 4 and looking in the direction of the arrows.

FIG. 4, an enlarged longitudinal cross-sectional view taken generally on the plane of line 4—4 of FIG. 2, illustrates the housing 12 as comprising a cylindrical passage 48 formed therethrough and having enlarged cylindrical openings 50 and 52 at respective opposite ends thereof. A valve member 54, having a generally cup-shaped end portion 55 with a pilot diameter 56 closely slidably received in cylindrical passage 48, has a radiating flange portion 58 which abuts against the radiating portion 60 of enlarged cylindrical opening 50. Further, the generally transversely extending wall 62 of cup-shaped end portion 55, carries a centrally disposed axially extending valving portion 64 which is suitably contoured for the particular use for which the flow sensor is intended. As shown in both FIGS. 4 and 6, the transverse wall 62 has a plurality of passages or apertures 66 formed therethrough to permit the relatively unrestricted flow of fluid therethrough. The term "relatively unrestricted" is employed because the total effective flow area of such orifices 66 is substantially greater than the effective flow area of the downstream variable orifice to be described. As also shown in FIG. 4, suitable passage means, as at, for example, 61 are provided in order to permit the ready and quick filling of chamber 118 and cylinder 48, between opposed piston ends 82 and 84, by the fluid directed through the inlet of the sensor assembly 10. The fluid thusly admitted will provide for hydraulic balance of the piston member 78 except for the opposite end surfaces of piston 78 directed to the inlet and outlet means 122 and 124.

As shown, the end member 14 is also provided with a pilot diameter 68 closely received within enlarged cylindrical opening 50 in a manner as to generally contain and retain between itself and cup-shaped portion 55, of valve member 54, the radiating flange 70 of a filter member 72 which generally extends into a chamber 74 of end cap member 14. Preferably an O-ring type seal 76 is provided to prevent fluid leakage.

A spool-type axially displaceable cylindrical valve or orifice member 78 is slidably received within cylindrical passage 48. In the preferred embodiment, the orifice member 78 is formed of a plastic material and has a longitudinally extending tubular body portion 80 interconnecting enlarged cup-shaped cylindrical portions 82 and 84 at opposite ends thereof. In the preferred embodiment the orifice member or piston 78 is formed of a plastic which is tough, resilient, has a high tensile strength, high flexural modulus, high fatigue endurance and a slippery low friction surface. It has been discovered that acetal resin, a high melting, highly crystalline, thermoplastic polymer having a chemical structure represented by the formula $(-OCH_2-)_n$ is highly suited for forming the piston 78. In this connection it has also been discovered that an acetal resin derived by polymerization of formaldehyde and sold commercially under the trademark, Delrin, is particularly suitable for forming the piston 78. Delrin acetal resin as tested by the ASTM (American Society of Testing Materials) under standard conditions possesses the following physical properties:

| Property | ASTM No. | Value |
| --- | --- | --- |
| Tensile strength at 75°F | D-638 | 10,000 p.s.i. |
| Flexural modulus at 73°F | D-790 | 410,000 p.s.i. |
| Specific gravity | D-792 | 1.425 |
| Melting point (crystalline) | | 347°F |
| Coefficient of linear thermal expansion | D-696 | $4.5 \times 10^{-5}$ |
| Thermal conductivity | | 1.6 B.t.u./hr./sq.ft./°F./in. |

The left end (as viewed in FIG. 4) or forward end of piston 78 is provided with a calibrated orifice 86 which cooperates with contoured valving portion 64 as to control the rate of fluid flow therebetween, while the right cup shaped cylindrical portion 84 receives one end of a compression spring 91 the other end of which is suitably seated as within end cap member 16. Spring 91 is of a comparatively high rate and, of course, the calibration thereof is selected for the particular sensitivity and other operating parameters required or desired of the flow sensor assembly 10.

Figure 5:
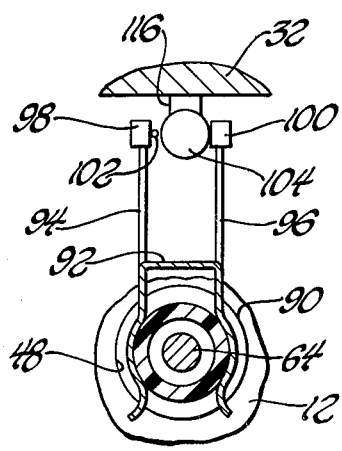
FIG. 5 is a fragmentary cross-sectional view taken generally on the plane of line 5—5 of FIG. 4 and looking in the direction of the arrows.

In the preferred embodiment, tubular portion 80 of piston 78 is provided with spaced radially extending annular surfaces 88 and 90 which cooperate to define a general annular recess therebetween. An electrically conductive, generally U-shaped, clip 92 is situated generally on annular raised portions 88 and 90 and, in turn, as generally illustrated in FIG. 5, carries a pair of electrically conductive arms 94 and 96 which are respectively provided with electrical contacts 98 and 100. Contact 98 is continually maintained in sliding electrical engagement with a longitudinally extending electrically conductive rod-like member 102 while contact 100 is maintained in sliding electrical engagement with a wound electrical resistance element 104 carried as by a cylindrical support member 106. Rod 102 and resistance element 104, as shown in FIG. 5, although generally parallel to each other are, nevertheless, spaced from each other so that the only electrical path therebetween is through contacts 98, 100 arms 94, 96 and clip 92. As depicted in FIG. 4, one end of rod 102 may be directly soldered to terminal portion 108 while the opposite one end of resistance element 104 is electrically connected as by a lead 110 to terminal portion 112. The entire wound resistance element 104 and its cooperating support 106 may be suitably connected to cover 32 by any suitable means as at 114 and 116.

Figure 7:
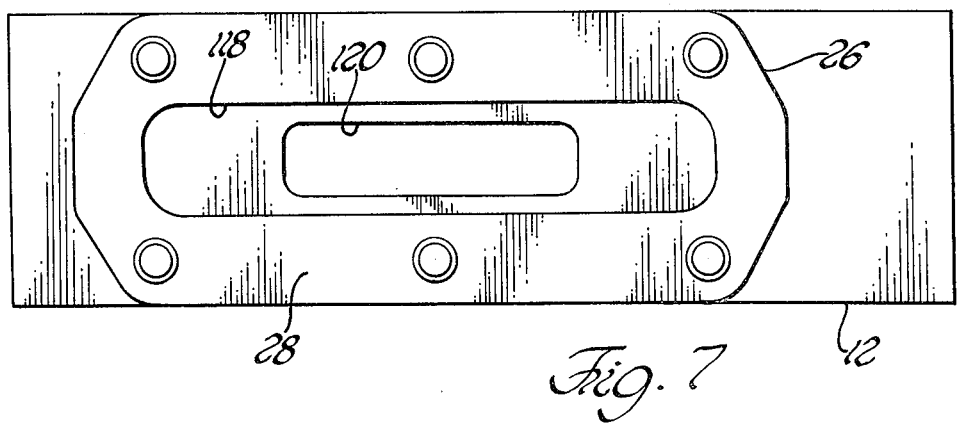
FIG. 7 is a top plan view, in reduced scale, of one of the elements of the assembly of FIG. 4 with such view being taken generally on the plane of line 7—7 of FIG. 4 and looking in the direction of the arrows.
Figure 8:
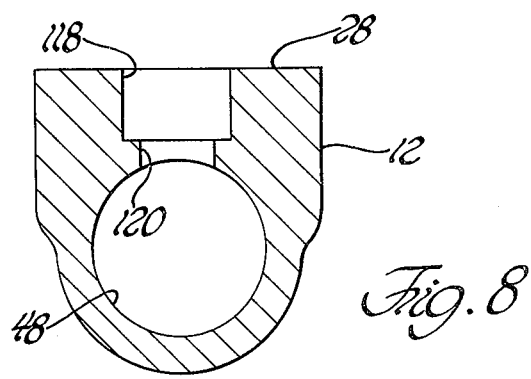
FIG. 8 is a cross-sectional view, in reduced scale, of one of the elements of the assembly of FIG. 4 with such view being taken generally on the plane of line 8—8 of FIG. 4 and looking in the direction of the arrows.

FIG. 7 is a view taken generally on the plane of line 7—7 of FIG. 4, looking in the direction of the arrows, showing, in reduced scale, only the housing 12 without any of the other elements of the assembly, while FIG. 8 is a view taken generally on the plane of line 8—8 of FIG. 4, showing the housing 12 in cross-section and of reduced scale, also without any of the other elements of the assembly. FIGS. 4, 7 and 8, when collectively viewed, illustrate that, in the preferred embodiment, housing 12 has an elongated chamber-like recess 118 formed therein which is of a size and configuration adapted for the reception therein of the conductive rod 102, resistance element 104 and support 106, terminal portions 112, 108, and wipers or contacts 98 and 100. The passage of such contacts 98 and 100 is made possible as by an elongated clearance aperture 120 which, generally, communicates between cylindrical passageway 48 and chamber 118.

GENERAL OPERATION OF FLOW SENSOR ASSEMBLY

As fluid is supplied, for example by means 42 of FIG. 1, the fluid enters inlet conduit means 122 and passes through the filter 72 and orifices 66 until it flows against the projected effective forwardly disposed surface area of piston portion 82 of piston member 78. Depending upon the magnitude of flow of such fluid, a force, due to the orifice 86 and valving member 64, will be created axially against piston member 78 causing it to respond by at least tending to move to the right (as viewed in FIG. 4). Piston member 78 will actually move axially to the right against the resilient resistance of spring 86 until an equilibrium is attained as between the effective force generated by the fluid flow through the effective flow area of orifice 86 and the force generated by the resulting deflection of spring 91.

In so moving to the right, the effective flow area as between piston orifice 86 and valving member 64 is increased and electrical contacts 98 and 100 are moved to the right along resistance element 104 and rod 102 with the result now that the value of electrical resistance is changed and such change may then be employed as a signal indicative of the mass flow of fluid through the effective orifice 86 and out the outlet conduit means 124. Since the rate of flow of fluid through a fixed orifice, in the main, varies as the square of the pressure differential thereacross, such an exponential factor can be, and in the preferred embodiment is, compensated for as by the contouring of valving member 64 so as to result in a precise increase in effective flow area as between the valving member 64 and orifice 86 for every incremental axial displacement or position of piston member 78. In so doing it has been found that incremental increases in rates of mass fluid flow from the inlet 122 through the outlet 124 result in corresponding incremental changes in the value of the electrical resistance caused by contacts 98 and 100 changing their positions. Consequently, it has been discovered that when such rates of mass fluid flow are plotted against corresponding changes or values of electrical resistance, a resulting graph of linear relationship therebetween is achieved. As an example, FIG. 10 illustrates such a graph wherein two gasolines of differing specific gravities were used as the fluid being flowed. As can be seen the various points (one set depicted by "O" points and the other set depicted by "+" points), within practical limits of recording and plotting, define a substantially straight-line function.

FURTHER DETAILED DESCRIPTION OF PREFERRED EMBODIMENTS

Figure 9:
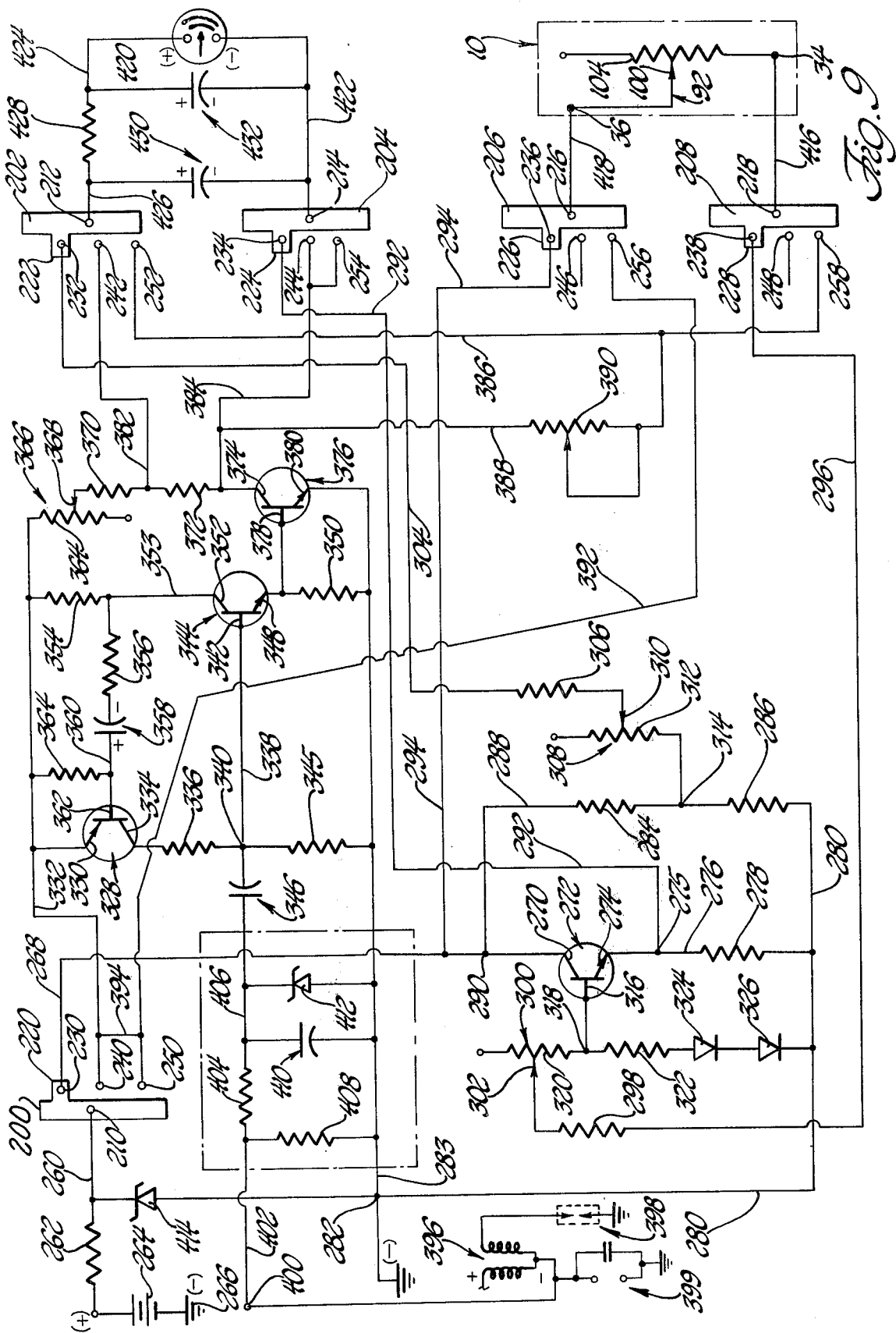
FIG. 9 is a schematic wiring diagram of circuitry employable in combination with said flow sensor for producing read-out type outputs for functions as gallons of fluid consumed per unit of time and miles of vehicular travel per gallon of fluid (fuel) consumed.

FIG. 9 is a schematic wiring diagram (which as previously indicated may actually comprise portions 38 and 40 of FIG. 1) illustrating an overall system in which, for example, it becomes possible to obtain direct meter read-out, as in an automotive vehicle, of gallons per hour of fuel consumption and/or miles per gallon.

In FIG. 9, switch elements 200, 202, 204, 206 and 208 are ganged as to move in unison from one selected position to another. Generally, terminals 210, 212, 214, 216 and 218, leading to their respective conductors, may be considered as being fixedly secured to the respective cooperating switch elements as to move therewith. Diagrammatically illustrated tabs 220, 222, 224, 226 and 228 of the respective switches are shown respectively engaging contacts 230, 232, 234, 236 and 238 which, may be regarded as a "first position" for such switches. A "second position" of such switch elements may be regarded as being achieved when such switch elements are moved downwardly as to cause said tabs to respectively engage contacts 240, 242, 244, 246 and 248 while a "third position" would be that when the said tabs are respectively engaged with contacts 250, 252, 254, 256 and 258.

A conductor 260, including a series limiting resistor 262, is connected to terminal 210 and to the positive terminal of a related source of electrical energy 264 which may be grounded as at 266.

Conductor 268, connected at one end to contact terminal 230, leads to the collector 270 of an N-P-N transistor 272 which, in turn, has its emitter 274 connected through conductor means 276 and series resistor 278 to conductor means 280 which, as shown, has its one end connected as at 282 to conductor means 283 leading to ground. Resistors 284 and 286 situated in series with each other and with one end of conductor 280 are electrically connected as by conductor means 288 to conductor 268 as at 290.

Switch contact terminal 234 is connected to emitter 274 of transistor 272 as by means of conductors 292 and 276 while switch contact terminal 236 is connected to collector 270 of transistor 272 as by means of conductors 294 and 268. Switch contact terminal 238 is connected via conductor 296 and series resistor 298 to a first potentiometer 300, as through its wiper contact 302, while switch contact terminal 232 is connected via conductor 304 and series resistor 306 to a second potentiometer 308, as through its wiper contact 310. One end of potentiometer 308 resistor 312 is connected as at 314 between resistors 284 and 286.

Base terminal 316 of transistor 272 is connected as at 318 as to be generally between one end of potentiometer 300 resistor 320 and a second resistance 322 is series therewith. The other end of resistor 322 is connected as through series diodes 324 and 326 to conductor 280.

A second transistor 328 has its emitter 330 connected to a conductor 332 leading to switch contact terminal 240 while its collector 334 is connected through a resistor 336 to a conductor 338, as at 340, which, in turn, has one end connected to the base terminal 342 of a third transistor 344 and has an other end connected to one side of capacitor means 346. A second resistor 345 also connected at one end as at 340 has its other end connected to conductor 283. The emitter 348 of transistor 344 is connected as through a resistor 350 to conductor 283 while the collector 352 thereof is connected to conductor 332 through conductor means 353 and a resistor 354. A resistor 356 connected at one end to conductor 353 has its other end connected to one side of a capacitor 358 which, in turn, has its other side electrically connected via conductor means 360 to the base terminal 362 of transistor 328. A resistor 364 has its opposite ends respectively connected to conductors 322 and 360. As shown, conductor 332 is connected to one end of the resistor element 364 of a third potentiometer 366 having a wiper contact 368 electrically connected via series resistors 370 and 372 to the collector 374 of a fourth transistor 376. The base terminal 378 and the emitter 380 of transistor 376 are respectively electrically connected to the emitter 348 of transistor 344 and to ground conductor 283.

Switch contact terminal 242 is electrically connected via conductor means 382 to a point generally between resistors 370 and 372 while switch contact terminal 244 is connected via conductor means 384 to the collector 374 of transistor 376. Switch contacts 252 and 258 are interconnected as by conductor means 386 and, conductor means 384 and 386 are, in turn, interconnected as by conductor means 388 including variable resistance means 390 in series therein.

Switch contact terminals 250 and 256 are electrically interconnected as by conductor means 392 which, in turn, is also connected to conductor means 332 and switch contact terminal 240 via conductor means 394.

A vehicular ignition coil assembly, shown in very simplified form as at 396 (with a typical associated spark plug depicted as at 398 and the conventional ignition breaker contacts and condenser as at 399) is illustrated as having its negative connection electrically connected as to a terminal 400 of conductor means 402 which, in turn, is electrically connected to one end of a resistor 404 which has its other end connected via conductor means 406 to one side of capacitor 346. As shown, resistor 408 electrically interconnects conductors 402 and 283 while a capacitor 410 and a zener diode 412 interconnect conductors 283 and 406. A second zener diode 414 is placed as across conductors 260 and 283 so as to regulate the voltage thereacross.

The flow sensor assembly is functionally depicted within the phantom lines at 10 and terminals 34 and 36 thereof are respectively electrically connected via conductor means 416 and 418 to switch terminals 218 and 216.

A read-out meter (or other suitable output device) is diagrammatically illustrated as at 420 and as having a plurality of scales or graduations thereon. The meter 420 has one of its terminals connected to switch terminal 214 as by conductor means 422 while its other terminal is connected via conductors 424 and 426, along with series resistor 428, to switch terminal 212. A first capacitor 430 has one of its sides connected to conductor 422 while its other side is connected to conductor 426 and a second capacitor 432 has its one side connected to conductor 422 while its other side is connected to conductor 424.

OPERATION OF INVENTION AS SHOWN BY FIG. 9

Before progressing to the actual operation, it should be pointed out that the meter 420 is of the type wherein the scales or graduations are of equal spacing. That is, for every equal increment of input, the meter needle (or other indicator) will similarly provide an equal deflection or indication as compared to, for example, an analog type meter.

With switches 200, 202, 204, 206 and 208 in their first position or mode, and with zero-flow through the flow sensor 10, wiper contact 302 of potentiometer 300 is adjusted so as to result in zero current flow through the meter 420 thereby causing the voltages at points 275 and 314 to be the same values. Transistor 272 functions as an amplifier or current gain device. Diodes 324 and 326 are provided for temperature compensation to the emitter-base circuit of transistor 272. Capacitor 432 is provided to dampen any possible pulsating flow due to, for example, continuing acceleration and deceleration of the related vehicle. That is, resistor 428 and capacitor 432 combine to form a damping circuit which, in at least one successful embodiment was about 3.0 seconds.

After the zero flow has been set by adjustment of potentiometer 300, the flow rate through the flow sensor assembly 10 is increased to, for example, 10.0 gallons per hour. Once the selected flow rate is established, potentiometer 308 is adjusted until the meter reads the desired output. Accordingly, if it is assumed that 0–10.0 gallons per hour was the entire maximum range to be flowed, the above would have established the end points on the meter 420 corresponding to such range. With the adjustments of potentiometers 300 and 308 thusly made, a balanced bridge circuit is attained. Further, because of zener 414 the voltage at point 314, between resistors 284 and 286, always remains fixed and constant. During operation of this gallons per hour circuit, (if in fact the unit of measurement selected for the system is in terms of gallons) an increase (as from zero) of flow through the flow sensor 10 wiper 100 is moved axially along resistance winding 104 causing an increase in the value of resistance at the flow sensor. As such resistance increases the value of the voltage at point 275 decreases causing an increase in current flow from point 314, through conductors 304, 428, and meter 420.

For purposes of illustration, let it be assumed that the invention as herein disclosed and described is applied to an automotive vehicle, that means 42 of FIG. 1 represents a fuel pumping and supply system, that the flow sensor 10 receives such fuel through its inlet and, in the manner previously described, enables such fuel to flow as to suitable related vehicular engine induction means as depicted at 44. Such means 44 could be a carburetor, a fuel injection system or even any combination thereof. Consequently, it can be appreciated that a vehicle so equipped with the sensor 10 and the related circuitry of FIG. 9 would continuously provide a direct read-out signal, as by means of meter 420, to the vehicle operator of the actual time rate of fuel consumption of the vehicular engine during all conditions of vehicle operation.

With switch members 200, 202, 204, 206 and 208 moved to their respective second positions, the tachometer circuit is energized. Resistors 404, 408, capacitor 410 and zener diode 412 comprise a pulse shaping network which is connected as by conductor means 402 to the negative terminal of a related engine ignition coil 396. Capacitor 410 and resistor 404 serve as a filtering network which adequately filters such transients as may arise as from, for example, ignition contact bounce. Zener diode 412 functions to limit the voltage across conductors 406 and 283 in order to establish a fixed reference point and thereby establish a fixed amplitude to the square wave signal generated in response to ignition contact opening and closing.

Capacitor 346 is a differentiating capacitor to differentiate the constant pulse-width or square wave signal and instead create as at 340 a spike-like pulse of relatively short duration.

Transistors 328 and 344 comprise a monostable multivibrator. That is, when point 340 receives a pulse both transistors 328 and 344 become conductive through their respective emitter-collector circuits. That is, as transistor 344 is first turned on, it forward biases the base of transistor 328 as through the current draw through resistor 356 and capacitor 358 causing it to go into conduction. When capacitor 358 becomes fully charged, transistor 328 becomes turned off causing the voltage at 340 to go to ground and thereby removing the forward bias on transistor 344 causing it to turn off. Capacitor 358 then discharges as through the circuit 356, 354, 332 and 364 so as to be ready for the occurrence of the next pulse signal. In the preferred embodiment the "off" time of transistor 328 is substantially greater than the "on" time thereof. Transistor 376 is, of course, turned "on" when transistor 344 is "on" and serves as the main switching device in circuit with conductor 283.

Potentiometer 366 is, of course, adjusted until the meter 420 reads the particular R.P.M. at which the related engine is operating.

As transistor 376 is turned "on" the pulses generated thereby are effectively integrated by resistor 372 and capacitor 430 as to thereby average such pulses and produce a linear voltage across resistor 372. The meter 420, placed generally in parallel with resistor 372, of course, responds to such linear voltage signal by indicating the particular engine R.P.M. sensed.

With switch members 200, 202, 204, 206 and 208 in their respective third positions the flow sensor circuit portion is employed in combination with the tachometer circuit described above. If in this third position it is desired to measure miles per gallon of fuel, certain basic problems must be overcome. That is, if the engine was at zero R.P.M. but there was some flow of fuel, there would be a zero miles per gallon condition; if on the other hand there was some slight engine speed but no fuel flow, there would be an infinite miles per gallon. These, in effect, define the extreme ends of the entire range and are "zero" and "infinity". It has always been a major problem in attempting to achieve linearity in such a range.

It has been discovered that it is very important to keep the ratio of the flow sensor resistance to the resistance of the tachometer very large. Accordingly, it has been discovered that desired linearity can be achieved if, for example, the circuit components are selected as to have a voltage drop across the flow sensor resistance even as high as, but not limited to, for example, in the order of 100 times the voltage drop across rheostat 390.

When the circuit is in the miles per gallon mode, elements 368 and 372 become essentially non-functional and their respective functions, as did previously exist in the tachometer mode of operation, are now respectively performed by flow sensor resistance means 104, 100 and rheostat 390.

The actual operation of the miles per gallon circuit can most easily be understood when it is realized that the flow sensor element 104 will produce an inversely varying voltage, indicative of mass rate of fuel flow, applied, in turn, to the rheostat 390 and capacitor 430 of the tachometer which now integrate the engine pulses. This can be summarized by the following expression:

$$M.P.G. = E_M \frac{E_{390} \div R.P.M.}{E_{F.S.} \div \text{Rate of Flow}}$$

where:

$E_M$ = voltage across meter 420
$E_{390}$ = voltage drop across resistor 390
$E_{F.S.}$ = voltage drop across sensor element 104

It should again be pointed out that the flow sensor 10 and related circuitry enable the use of a totally linear meter 420 with, of course, a linear read-out.

MODIFICATIONS OF INVENTION

In FIG. 11 a modification of the flow sensor 10 all elements which are like or similar to those of FIGS. 1–4 are identified with like reference numbers.

The main difference is that in flow sensor 10a, piston 78 has a closed end wall 79 as at cup shaped portion 84 to prevent flow therethrough while providing a plurality of radially directed passages 81 formed in the tubular portion 80 as to permit the relatively unrestricted flow of fluid therethrough.

The fluid is thusly admitted into cylinder 48 between the opposed cup-like portions and reacts against the rear cup-like portion 84 to thereby move piston 78 to the right against spring 91. As the piston 78 is thusly moved, a contoured port or passage 83 formed in the side wall of cylinder 48 is opened permitting the flow therethrough of the fluid being sensed. As should be apparent from the preceding descriptions and the drawing, the more piston 78 is moved to the right the greater the effective flow area of passage 83 thereby having the same ultimate result as the cooperating orifice 86 and contoured valve 64 of FIG. 4.

FIG. 13 is a fragmentary side elevational view, similar to FIG. 1 but illustrating a modification of the cover and associated circuit carried thereby. In the embodiment of FIGS. 13–16, a seal 500 is situated atop surface 28 of housing 12 extension 26 and, in turn, carries a printed circuit board 502 thereon with a cover 504 serving to hold all in assembly as by screws 506. A plurality of external electrical terminals 508, 510 and 512 are carried by the board 502 and electrically connected to printed circuits 514, 516 and 518 formed on the underside. A wound resistance coil 520, similar to 104, is suitably secured to board 502 as by means 522 and has one end connected as to circuit 518 and terminal 512 while the other end of coil 520 is connected to circuit portion 516 and terminal 510. A rod 524, similar to rod 102, is carried by board 502 and has its one end connected to circuit portion 514 and terminal 508.

When the printed circuit board and resistance element 520 and rod 524 are assembled, a wiper contact functionally equivalent to 92 will engage both the resistance coil 520 and rod 524 in the manner generally described with reference to FIG. 4. However, because of the three-terminal arrangement, the varying resistance created by movement of the wiper contact will be that of a potentiometer, and not a rheostat, the output of which may be employed as signals to an analog or digital system schematically depicted as at 526.

Figure 18:
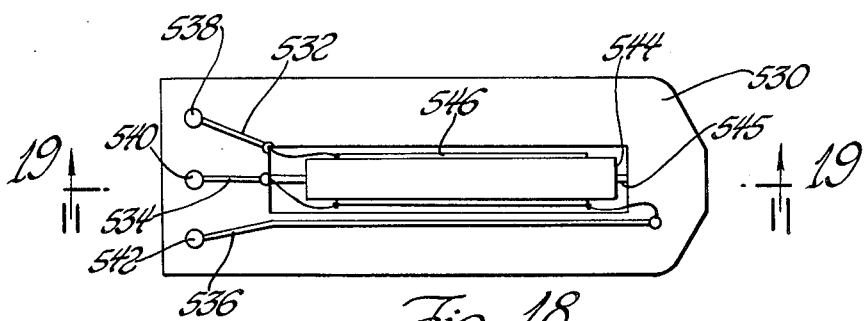
FIG. 18 is a bottom plan view of a modified form of certain of the elements shown in, for example, FIG. 4.
Figure 19:
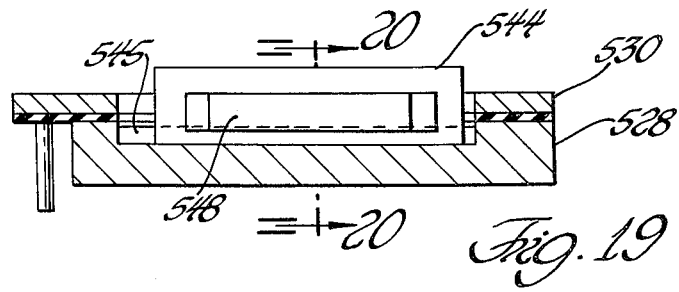
FIG. 19 is a cross-sectional view taken generally on the plane of line 19—19 of FIG. 18 and looking in the direction of the arrows.
Figure 20:
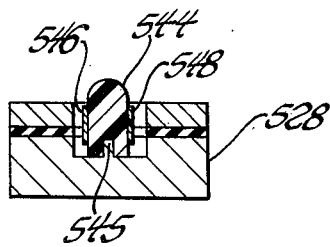
FIG. 20 is a cross-sectional view taken generally on the plane of line 20—20 of FIG. 19 and looking in the direction of the arrows.

FIGS. 18, 19 and 20 illustrate another form of resistance element carried by a cover 528 in combination with a printed circuit board 530. The underside of board 530 is provided with printed circuit portions 532, 534 and 536 which are respectively electrically connected to exterior terminals 538, 540 and 542.

A longitudinally extending plastic carrier or body 544, secured as to a rib 545 formed in cover 528, carries at opposite sides thereof a conductive strip 546, electrically connected at one end to terminal 538, and at the opposite side a resistive element 548 electrically connected at opposite ends respectively to terminals 540 and 542. The resistive strip 548 can be physically tailored and contoured as to achieve any desired relationship as between piston displacement (rate of mass flow) and the corresponding resistance value. This becomes important especially where it is desired to have, for example, a generally straight tapered valving member instead of the specially contoured valve member 64 of FIG. 4. In such case the resistance element 548 may be easily shaped or tailored in order to still achieve desired linearity (or any other desired relationship) as between rate of fluid flow and the resistance generated by displacement of piston means 78 in response thereto. It should be apparent that the same applies equally well to the porting means 83 and piston 78 of FIGS. 11 and 12.

Figure 21:
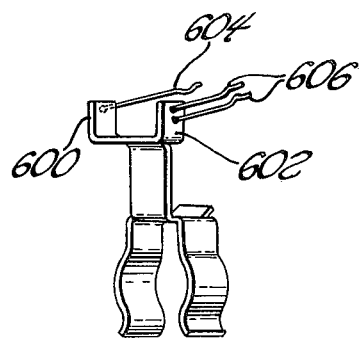
FIG. 21 is a perspective view of a modified form of one of the elements shown in FIG. 4.

FIG. 21 illustrates another embodiment of a wiper contact assembly (functionally equivalent to 96) wherein upstanding arm portions 600 and 602 pass on opposite sides of the rod 102 (or 524 or strip 546) and resistance coil 104 (or 520 or strip 548) while the spring-like arm-like contacts 604 and 606 are placed in wiping contact therewith.

Although only a select number of embodiments and modifications of the invention have been disclosed and described, it is apparent that other embodiments and modifications of the invention are possible within the scope of the appended claims.

It should be apparent that the flow sensor of the invention may be employed in any number of environments. For example, it may be employed for measuring any desired fluid flow whether liquid or otherwise; it may be employed in a closed-loop fluid metering system which, upon sensing too great a fluid flow for particular parameters, will develop a feed-back system as to related pumping or supply means to reduce the mass rate of fluid flow. Various other uses and arrangements will, of course, become apparent to those skilled in the art.

I claim:

1. Electrical circuit means, for use in an automotive vehicle having a fluid-fuel consuming engine, for producing, in response to a plurality of variable input signals indicative of indicia of vehicle operation, a linear output signal corresponding to the distance-rate of consumption of said fuel, said electrical circuit means comprising first branch electrical circuit means effective for opening and closing related electrical output circuit means in timed relationship to the speed of operation of said engine for producing a first variable electrical signal indicative of engine speed, second branch electrical circuit means effective for producing a second variable electrical voltage signal the magnitude of which varies in a linear relationship with respect to the rate of flow of said fuel to said engine, and electrical output means operatively connected to said output circuit means and adapted to be responsive to said second variable electrical signal, said output means being effectively acted upon by said second variable electrical signal whenever said output circuit means is closed in response to said first electrical signal for producing an output in response thereto, said first branch electrical circuit means comprising electrical multivibrator means, said multivibrator means comprising first and second transistor means electrically interconnected to define monostable multivibrator means, each of said first and second transistor means comprising a base terminal and an emitter-collector circuit, said first branch circuit means further comprising switching transistor means having a base terminal thereof electrically connected to the emitter-collector circuit of one of said first and second transistor means, said switching transistor means also comprising an emitter-collector circuit, and said output circuit means being electrically connected to said emitter-collector circuit of said switching transistor means.

2. Electrical circuit means according to claim 1 wherein said output circuit means further comprises integrating means effective for averaging-out the values of said first variable electrical signal.

3. Electrical circuit means, for use in an automotive vehicle having a fluid-fuel consuming engine, for producing, in response to a plurality of variable input signals indicative of indicia of vehicle operation, a linear output signal corresponding to the distance-rate of consumption of said fuel, said electrical circuit means comprising first branch electrical circuit means effective for opening and closing related electrical output circuit means in timed relationship to the speed of operation of said engine for producing a first variable electrical signal indicative of engine speed, second branch electrical circuit means effective for producing a second variable electrical voltage signal the magnitude of which varies in a linear relationship with respect to the rate of flow of said fuel to said engine, electrical output means operatively connected to said output circuit means and adapted to be responsive to said second variable electrical signal, said output means being effectively acted upon by said second variable electrical signal whenever said output circuit means is closed in response to said first electrical signal for producing an output in response thereto; and operator actuatable switch means, said switch means having at least two operating positions one of which is effective to electrically disconnect said second branch electrical circuit means to thereby prevent the application of said second variable electrical signal to said output means.

4. Electrical circuit means according to claim 3 wherein said switch means is effective when actuated to another of said at least two operating positions to electrically disconnect said first branch electrical circuit means while electrically closing third branch electrical circuit means and said second branch electrical circuit means to thereby prevent application of said first variable electrical signal to said output means while enabling said second variable electrical signal to be amplified by said third branch electrical circuit means and applied to said output means.

5. Electrical circuit means according to claim 4 wherein said third branch electrical circuit means comprises first adjustable variable resistance means, second adjustable variable resistance means, and transistor means, said transistor means comprising a base terminal and an emitter-collector circuit wherein said first adjustable variable resistance means is electrically connected generally between said second branch electrical circuit means and said base terminal, and wherein said second adjustable variable resistance means is electrically connected generally between said emitter-collector circuit and said output means.

6. Electrical circuit means, comprising first electrical conductor means adapted for connection to an associated source of electrical potential, first transistor means comprising a first base terminal a first emitter and a first collector, said first emitter and said first collector defining a first emitter-collector circuit, second transistor means comprising a second base terminal a second emitter and a second collector, said second emitter and said second collector defining a second emitter-collector circuit, third transistor means comprising a third base terminal a third emitter and a third collector, said third emitter and said third collector defining a third emitter-collector circuit, first resistance means electrically connected in series in said first emitter-collector circuit, said first emitter-collector circuit and said first resistance means being electrically connected at one end to said first conductor means and electrically connected at an other end to said second base terminal, first capacitor means having a first electrical side thereof electrically connected to said second base terminal, second electrical conductor means adapted for connection to a source for producing electrical pulses in timed relationship to the speed of operation of an associated fluid-fuel consuming engine, said second conductor means being electrically connected to a second electrical side of said first capacitor means, second resistance means electrically connected in series circuit with said second conductor means as to comprise a portion thereof and generally between said source of electrical pulses and said second side of said first capacitor means, first adjustable resistance means and third resistance means in series circuit with each other and in series circuit with said third emitter-collector circuit, third conductor means in series circuit with said third emitter-collector circuit and electrical ground potential, fourth resistance means electrically interconnecting said second emitter-collector circuit to said first conductor means, fifth resistance means electrically interconnecting said second emitter-collector circuit to said third conductor means, said third base terminal being electrically connected to said second emitter-collector circuit as to be generally electrically between said second transistor means and said fifth resistance means, sixth resistance means electrically connected to said first conductor means and to said first base terminal, second capacitor means having one electrical side thereof electrically connected to said first base terminal, seventh resistance means electrically connected to a second electrical side of said second capacitor means and to said second emitter-collector circuit generally electrically between said fourth resistance means and said second transistor means, eighth resistance means electrically connected to said third conductor means and to said second base terminal, ninth resistance means electrically connected across said second and third conductor means as to be generally between said second resistance means and said source for producing electrical pulses, third capacitor means electrically connected across said second and third conductor means as to be generally between said first capacitor means and said second resistance means, second adjustable resistance means operatively adjusted by associated fluid displaceable means responsive to the rate of flow of said fluid-fuel to said associated engine, electrical read-out gauge means, fourth electrical conductor means electrically interconnecting one electrical side of said gauge means to one electrical end of said second adjustable resistance means, tenth resistance means in series circuit with said fourth conductor means as to comprise a portion thereof and as to be situated generally electrically between said gauge means and said second adjustable resistance means, and fifth conductor means electrically interconnecting an other electrical side of said gauge means to said third emitter-collector circuit as to be in said third emitter-collector circuit generally electrically between said third transistor means and said third resistance means.

7. Electrical circuit means according to claim 6 and further comprising third variable resistance means electrically connected generally electrically across said fourth and fifth conductor means.

8. Electrical circuit means according to claim 7 and further comprising fourth capacitor means electrically connected generally electrically across said fourth and fifth conductor means.

9. Electrical circuit means according to claim 8 and further comprising fifth capacitor means, said fifth capacitor means being electrically connected to said fourth and fifth conductor means as to have one electrical side of said fifth capacitor means electrically generally between said tenth resistance means and said gauge means.

* * * * *

UNITED STATES PATENT OFFICE
CERTIFICATE OF CORRECTION

Patent No. 3,926,045               Dated Dec. 16, 1975

Inventor(s)   Gerald K. Miller

It is certified that error appears in the above-identified patent and that said Letters Patent are hereby corrected as shown below:

1. Column 10, line 68, after "across" insert --- flow ---.

2. Claim 3, line 22, after "thereto" change the semicolon (;) to a comma (,).

Signed and Sealed this

Second Day of January 1979

[SEAL]

Attest:

RUTH C. MASON
Attesting Officer

DONALD W. BANNER
Commissioner of Patents and Trademarks